W. G. ALLEN & R. G. HENRY.
SCREW THREAD CUTTING MECHANISM.
APPLICATION FILED FEB. 5, 1908.
928,489.
Patented July 20, 1909.
4 SHEETS—SHEET 2.
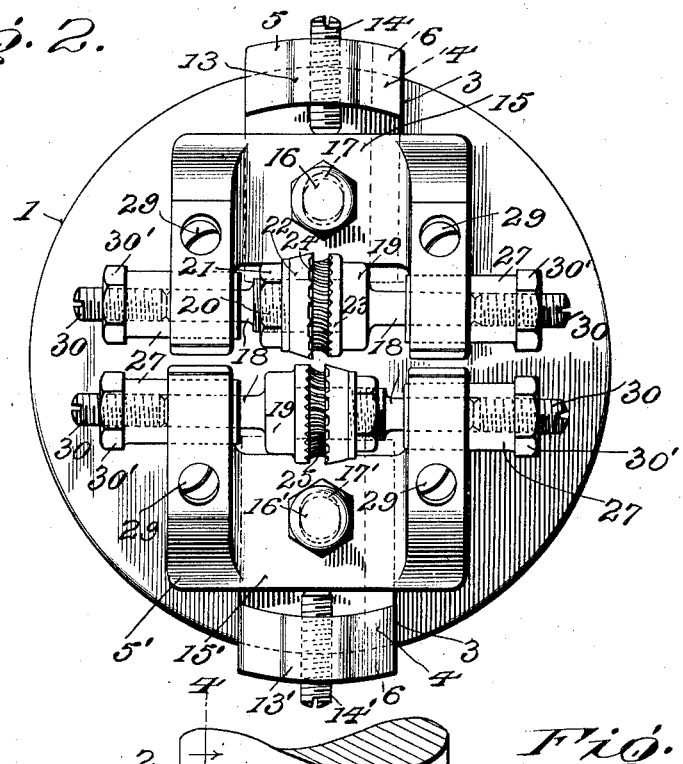
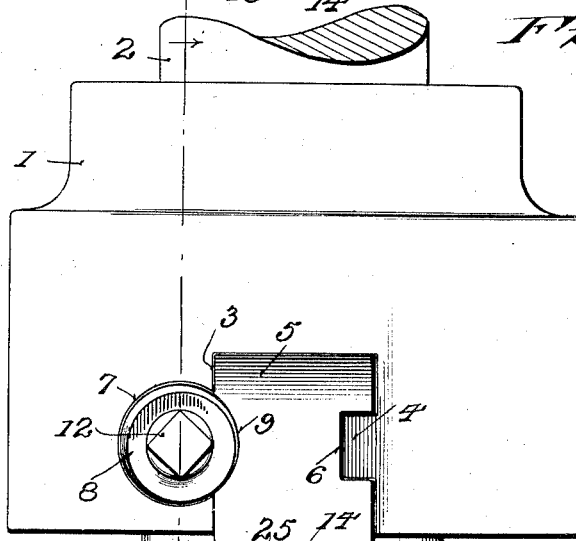

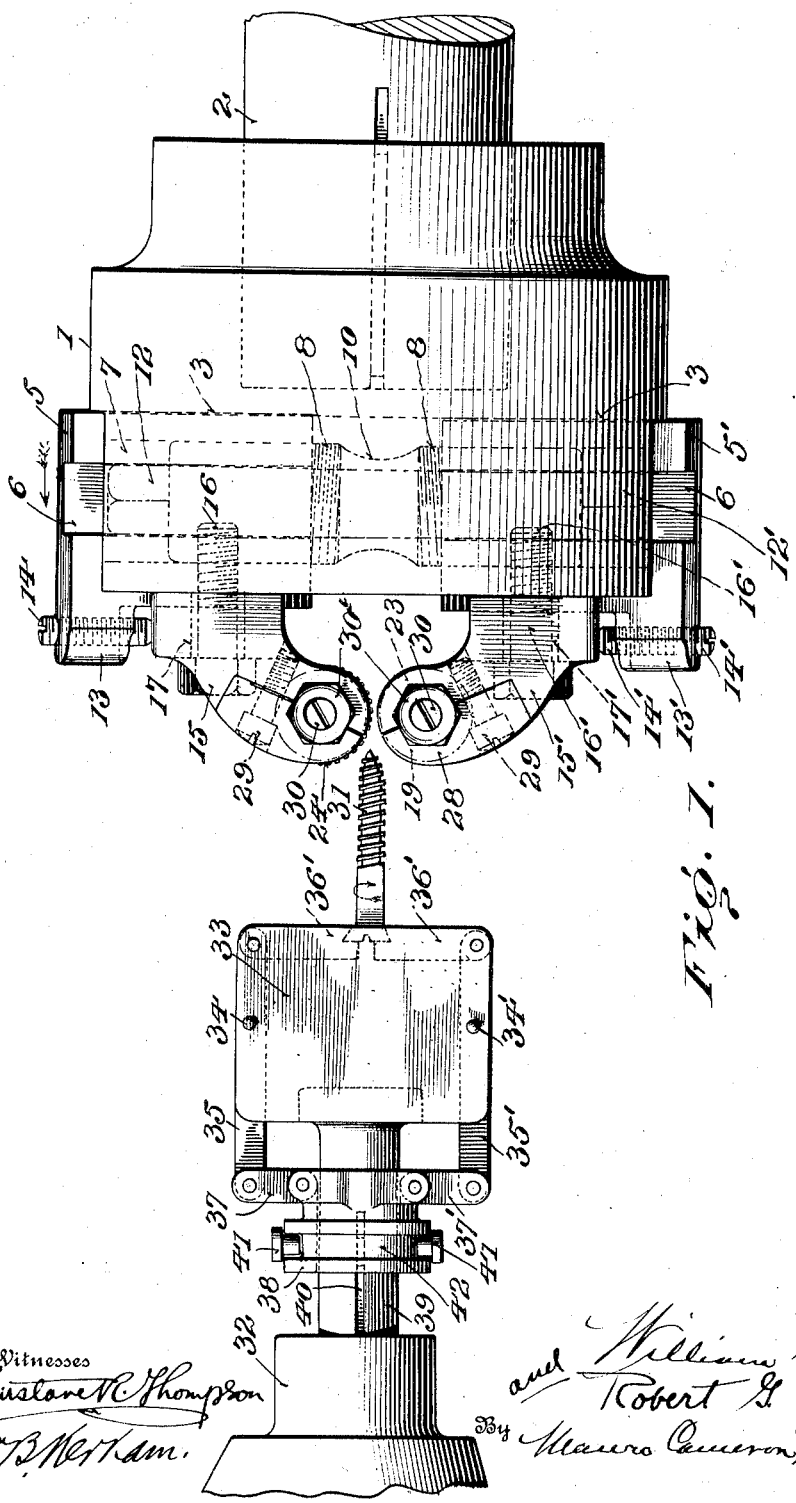

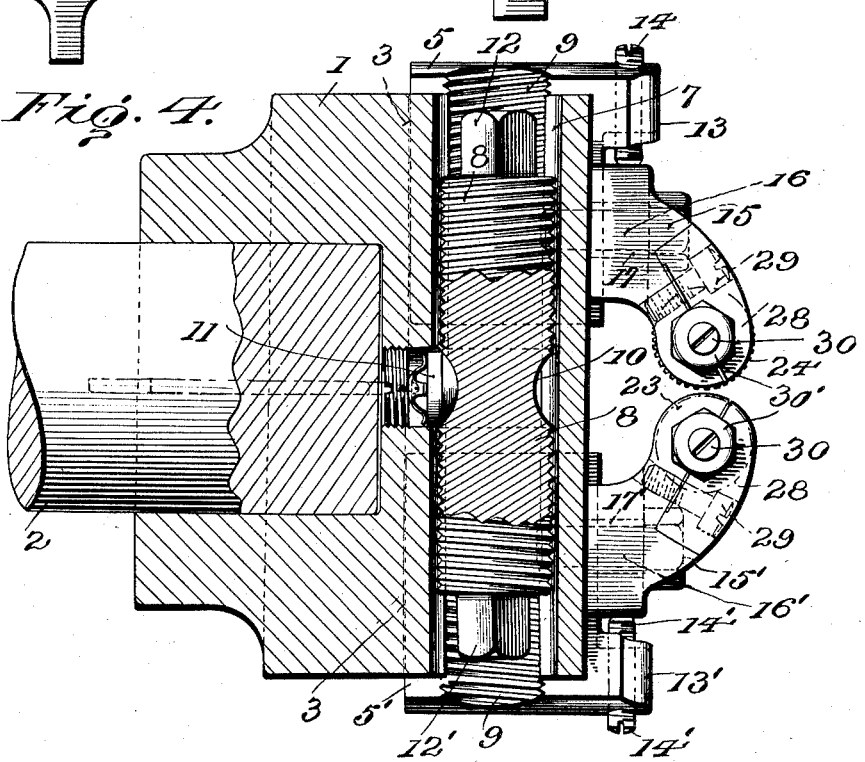

W. G. ALLEN & R. G. HENRY.
SCREW THREAD CUTTING MECHANISM.
APPLICATION FILED FEB. 5, 1908.
928,489.
Patented July 20, 1909.
4 SHEETS—SHEET 4.
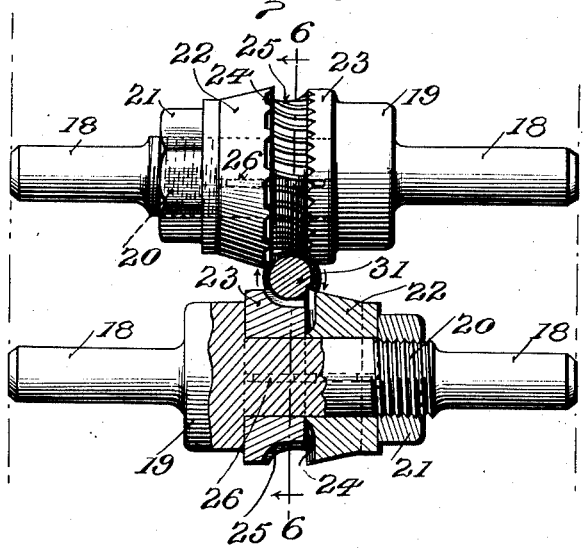
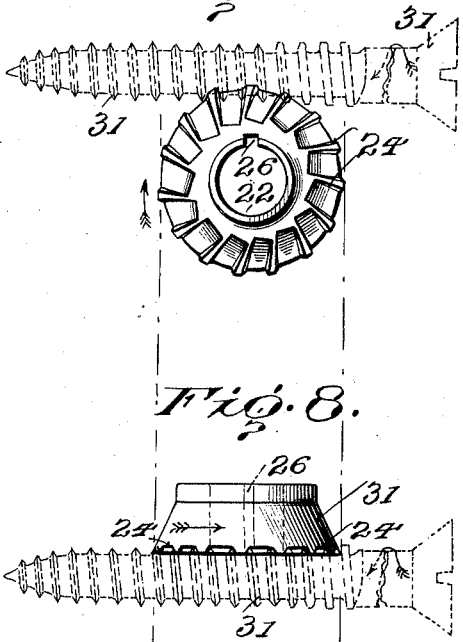
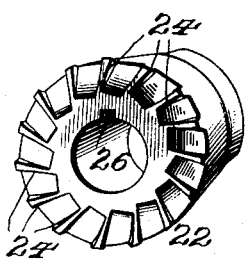
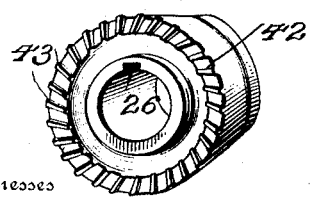
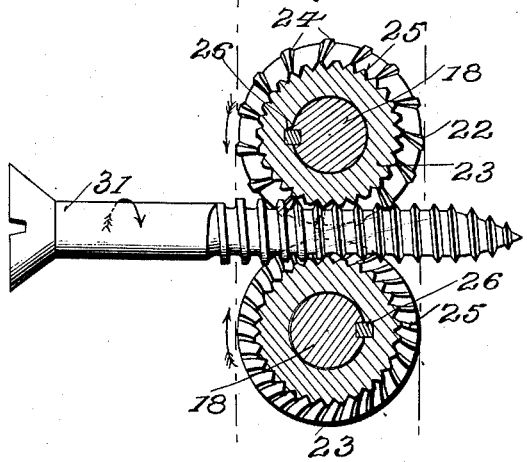
Witnesses
Inventors
William G. Allen
Robert G. Henry
By
Attorneys.

UNITED STATES PATENT OFFICE.

WILLIAM G. ALLEN AND ROBERT G. HENRY, OF HARTFORD, CONNECTICUT, ASSIGNORS TO THE GLOBE SCREW COMPANY, OF HARTFORD, CONNECTICUT, A CORPORATION OF CONNECTICUT.

SCREW-THREAD-CUTTING MECHANISM.

No. 928,489.  Specification of Letters Patent.  Patented July 20, 1909.

Application filed February 5, 1908. Serial No. 414,454.

*To all whom it may concern:*

Be it known that we, WILLIAM G. ALLEN and ROBERT G. HENRY, of Hartford, Connecticut, have invented new and useful Improvements in Screw-Thread-Cutting Mechanism, which invention is fully set forth in the following specification.

This invention relates to improvements for cutting threads on screws, bolts, or the like.

In our United States Letters-Patent No. 877,157, we have described and claimed an improved process of forming screw-threads on wood-screws, consisting generally in first forming the thread by cold forging, preferably cold rolling, and then bringing the forged thread to the desired dimensions by cutting.

The thread-cutter or thread-cutting mechanism constituting the present invention is especially designed for cutting previously formed threads, such as cold-forged screw-threads referred to above.

The invention may receive various mechanical expressions, one of which, for the sake of illustrating the invention is shown in the accompanying drawings, wherein—

Figure 1 is a top plan view including the cutters and their supporting head and the means for supporting the screw to be cut. Fig. 2 is a front elevation of the cutters and cutter-head of Fig. 1. Fig. 3 is a side view of said cutter-head, as shown in Fig. 1. Fig. 4 is a sectional view on the line 4—4, Fig. 3, looking in the direction of the arrows. Fig. 5 is a detail view showing the cutters one of them being shown in elevation, and the other in longitudinal section. Fig. 6 is a detail illustrating the action of the cutters and the engagement of the driving threads of the cutter with the threads of the work. Figs. 7 and 8 are additional details illustrating the action of the cutter; and Fig. 9 is a perspective view of the cutter disk alone. Fig. 10 is a perspective view of another expression of the inventive idea embodied in the cutter. Figs. 11 and 12 and 13 and 14 are detail views for the purpose of illustrating the principle upon which the cutter of the present invention works.

Referring to the drawings, in which like reference numerals indicate like parts, 1 is the cutter supporting-head suitably mounted on the member 2, which has reciprocating or longitudinal movement imparted thereto by any suitable mechanism, not shown.

A mortise or slot 3 is formed in the support 1 with a suitable rib 4 projecting from the body of the support into the mortise. Mounted in the mortise 3 are two slides 5, 5', each of said slides having a cut-away portion 6 into which rib 4 enters. On the opposite side of the mortise or slot 3 from rib 4 there is formed in the body of the support 1 a bore 7 within which there rests a right-and-left screw 8, said screw when resting in said bore has a portion of its threaded periphery projecting into the mortise or slot 3 and engaging screw-threads 9 formed in the sides of the slides 5, 5' adjacent to the screw. The screw has, at approximately its center, a circumferential depression 10, into which takes a part 11 which projects from the head into the bore 7, said part 11, in the present instance, being shown as formed separate from the head 1 and inserted into a suitable cavity, though manifestly, if desired, it may be formed integrally with the head, the separable form, however, being preferred for convenience in assemblage of the parts. For convenience of operating screw 8, it is provided with bolt heads 12, 12' on its opposite ends, by means of which the screw may be turned for moving the slides toward or from each other in a way that will be readily understood, the projection 11 preventing the screw from moving longitudinally within the bore.

The slides 5, 5' have at their outer extremities forwardly projecting lugs 13, 13', through which lugs are threaded screws 14, 14' bearing upon their inner ends against two bracket-pieces 15, 15' mounted upon the slides 5, 5'. Said bracket-pieces are retained upon the slides adjustably by means of screws 16, 16', which pass through oblong holes or openings 17, 17', shown in dotted lines in Fig. 1. By loosening the screws 16, 16' by means of a wrench engaging the heads of said bolts or screws, the bracket-pieces may be adjusted toward or from each other, after which they are fixed in their position upon the slides 5, 5' by tightening the screw-bolts 16, 16', and the screws 14, 14' are then tightened up so as to bear firmly against the rear sides of the brackets to offer further resistance to any outward movement of the brackets.

Referring to Fig. 5, wherein is shown the detail construction of the cutters (a description of one of which will answer for both, since they are identical in form), 18 is a shaft, having to one side of its longitudinal center an enlargement or shoulder 19, and provided on the other side of its longitudinal center with screw-threads 20. The cutter is mounted with one of the faces thereof resting against the abutment 19 on the shaft, and is locked or held firmly in place by a nut 21 on the screw-threads 20. The said cutter is formed with cutting teeth and with driving teeth, both of which might, if desired, be formed in a single integral piece of metal; preferably, however, the cutter is formed in two parts, as shown in Fig. 5, one of these parts, 22, having the cutting teeth and the other part 23 having the driving teeth. The cutting member 22 is herein shown as in the form of an annular disk having thread-cutting teeth 24 formed on one of the side faces thereof, said teeth extending outward to the periphery of the disk, where their cutting edges are located. The cutting edges of the teeth and of the groove between the teeth may be sharpened by grinding the periphery of the disk. The driving or rotating portion 23 of the cutter is also in the form of a cylindrical block or disk having about its periphery adjacent to the cutting disk worm-teeth or threads 25. The two disks 22 and 23 are keyed to shaft 18 by means of a suitable key entering key-ways 26, said key and key-ways serving not only to key the two disks to the shaft, but also to determine their positions relative to each other.

In assembling the cutters in position for operation, they are mounted with their shafts 18 resting in bearings 27 (see Fig. 3), supported in the brackets 15, 15', said bearings being retained in position by means of caps 28 held in position by screws 29 (Fig. 4). The cutter shafts 18 are adjusted in bearings 27 by means of screws 30 threaded into the bearings 27 and bearing on the opposite ends of the shafts, so that the cutters may be adjusted to the exact point for effecting the proper cutting action upon the screw, after which the whole is locked in position by the lock-nuts 30', 30' on the screws 30.

As heretofore stated, the cutters of this invention are specially designed to operate upon previously formed threads for the purpose of accurately bringing them to the desired dimensions and imparting a finely cut or finished surface. In the enlarged detail views (Figs. 7, 8 and 9) part of the thread on the screw 31 is shown in the condition in which it has been previously formed, by cold rolling, for example, and part after it has been acted upon by the cutters. A single cutter might be used if suitable means were provided to hold the work in engagement therewith. It is preferable, however, to use two oppositely disposed cutters, arranged as shown in Figs. 2 and 5, each serving not only its cutting function, but each also serving to hold the work into engagement with the other cutter.

Referring to Fig. 1, 32 is any suitable rotatable head or part which carries on its outer extremity a block 33 having a suitably formed seat for receiving the head of the screw. Pivoted to the sides of the block at 34—34' are two oppositely disposed levers 35, 35' carrying gripping arms or fingers 36, 36' formed on their inner ends so as to effectively grip and retain the head of the screw, the formation of the seat in the block 33 and of the grips 36, 36' being such that the screw is compelled to revolve with the block 33. Pivoted to the rear end of levers 35, 35' are two links 37, 37' which are also pivoted at their other ends to a sliding collar 38, sliding on a reduced portion 39 of the revolving head 32, being provided with a key 40, however, which enters into a key-way so that said collar revolves with the head 32. Any suitable form of shifting lever, such for example as the common bifurcated shifting lever, with lugs 41—41 entering a groove 42, is employed for sliding the collar 38 upon the reduced portion 29 of the supporting head 32. The construction of the whole is such that when the collar is in the position shown in Fig. 1 the gripping members 36, 36' are in position to securely grasp the head of the screw. By sliding the collar to the left in Fig. 1, however, the levers 35, 35' are rocked upon their pivots 34 and the grips 36, 36' are loosened for releasing the screw.

In the operation of the mechanism shown in the drawings, the screw to be cut is held in the block 33 and the head 32 is revolved on its axis. The supporting-head 31 is then advanced longitudinally toward the screw, the parts being so adjusted that the screw will enter between the two cutters carried on the head. As the screw enters between the cutters the previously formed thread on the screw meshes with the worm-teeth or threads 25 on the cutters, and the speeds of the rotary movement of the screw and the longitudinal movement of the cutter-supporting head 1 are preferably proportioned to effect the rotation of the cutters in the direction indicated by the arrows in Fig. 6. The cutting-teeth on the cutters are thus brought one after another into action upon the work, the latter rotating toward the sharpened edges of the cutting-teeth and of the grooves between the teeth. The number of cutting-teeth on the cutters may for a given distance correspond with the number of threads on the work. For a thread having a sharp edge this would necessitate sharply defined V-shaped grooves separating the cutter-teeth, as diagrammatically shown in Fig. 12, and it would follow that adjacent teeth would simultaneously cut at directly opposite points on the thread. In such an arrangement, not only are the cutting edges of the grooves subject to very severe and rapidly wearing work, but the teeth simultaneously cutting are at directly opposite points on the thread, and this will subject the latter to great strains which may be sufficient at particularly weak points in the metal being cut to remove portions of the thread otherwise than by cutting. Moreover, the chips or shavings removed by the cutter from the thread in such case would be liable to find lodgment in the acute angle of the V-shaped point of the cutter, thereby clogging it in its work and further assisting in dulling it or unfitting it for the clean-cut action requisite for the perfect cutting of the thread. For the purpose of obviating these difficulties and objections, we preferably space the cutting-teeth two or more times as far apart as are the threads to be cut, this being an important feature of our present invention.

As clearly shown in Figs. 7 and 8, for example, the cutting-teeth are twice as far apart as the threads on the work, from which it follows that there are no V-shaped grooves between the teeth, and adjacent teeth do not simultaneously cut upon directly opposite portions of the thread. This will be apparent from a mere inspection of Figs. 7 and 8, and also from an inspection of Fig. 11, where the cutter is diagrammatically shown, the dotted lines leading to the teeth showing the lines of cut as they would be made by a cutter thus formed, as contra-distinguished from the lines of cut shown in Figs. 12 and 13 where the V-shaped form of cutter is employed. Fig. 14 shows the lines of cut that would occur by the use of a tool of the form shown in that cut.

In Fig. 10 we have shown a cutting disk differing slightly in form from that shown in the other figures. In this form the disk is slightly dished at the center, leaving an outer annular flat side-face 42, in which the cutting teeth 43 are formed.

In the operation of our invention as herein described, we have, for the purpose of clearness, shown the cutter supporting-head 1 as advancing in the line indicated in the arrow, Fig. 1, longitudinally upon the screw, while the screw is revolved in the direction shown by the arrow in said figure. It will be apparent, however, that the cutter-head 1 might be revolved and the screw advanced longitudinally; or either the screw or the cutter-head might be both revolved and advanced. We prefer, however, to revolve the screw and to advance the cutter-head, as shown in Fig. 1. When the cutters are advanced upon the revolving screw, if the rate of advance of the cutters be such that it merely advances over a distance equal of the pitch of the threads during one revolution of the screw, it will be apparent that the cutters would not be revolved by reason of the engagement of the threads upon the screw with the worm-teeth or driving threads 25 on the cutter. If, however, the longitudinal advance of the cutter-head is less than or greater than the pitch of the threads on the screw, during the time required for one revolution of the screw it will be apparent that the cutters will thereby be driven or caused to revolve upon their axes in one direction or the other, as the case may be, thus bringing the cutting-teeth in succession into action upon the thread of the work. For this reason, we preferably advance the cutter-head over the work at such a speed that it will pass over a longitudinal length of the screw exceeding that of the pitch of the screw during the time which it takes the screw to make one revolution.

The action of the screw upon the worm-teeth or feeding-teeth 25 of the cutter to revolve the same, and the cutting action of the cutter-teeth 24 upon the previously forged threads of the work will be most readily understood by an inspection of Figs. 6, 7 and 8, where the continuous engagement of the screw-threads with the worm-teeth on the cutter is clearly shown, and where also the action of the double-spaced cutting-teeth upon adjacent threads is fully disclosed.

By mounting two cutters, each provided with cutting teeth and with the worm-driving-teeth immediately opposite each other, and with the cutting-teeth portions of the two cutters reversed, as shown in Fig. 5, each cutter serves to hold the screw up to the action of the oppositely disposed cutter, and the screw is directed between the cutters in a straight line, resulting in perfect and uniform work.

What is claimed is:

1. A rotatable screw-thread cutter having cutting-teeth formed in a side-face thereof, said teeth extending outward and having their cutting edges at the periphery of the cutter, and driving-teeth adapted to mesh with the threads on the work and thereby rotate the cutter while it is acting on the work.

2. A rotatable screw-thread cutter comprising a cutting-member having cutting-teeth formed in a side-face thereof, said teeth extending outward and having their cutting edges at the periphery of the cutter, and a driving member having teeth adapted to mesh with the threads on the work, and means securing said members together to enable the said teeth to rotate the cutter while it is acting on the work.

3. A circular rotatable screw-thread cutter having cutting teeth formed in a side-face thereof, said teeth extending outward and having their cutting edges at the periphery of the cutter, said teeth being two or more times as far apart as the threads to be cut thereby.

4. A rotatable screw-thread cutter comprising an annular tapered disk cutting member having cutting-teeth formed in a side face thereof, said teeth extending outward and having their cutting edges at the periphery of the cutter, and driving teeth adapted to mesh with the threads on the work and thereby rotate the cutter while it is acting on the work.

In testimony whereof we have signed this specification in the presence of two subscribing witnesses.

WILLIAM G. ALLEN.
ROBERT G. HENRY.

Witnesses:
DANIEL M. WRIGHT,
THOMAS McDERMOTT.